(12) United States Patent
Lauer et al.

(10) Patent No.: US 12,046,957 B2
(45) Date of Patent: Jul. 23, 2024

(54) ELECTRIC MOTOR

(71) Applicant: Schaeffler Technologies AG & Co. KG, Herzogenaurach (DE)

(72) Inventors: Sandro Lauer, Baiersdorf (DE); Friedrich Schuler, Wilhelmsdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 865 days.

(21) Appl. No.: 17/049,622

(22) PCT Filed: Apr. 17, 2019

(86) PCT No.: PCT/DE2019/100355
§ 371 (c)(1),
(2) Date: Oct. 22, 2020

(87) PCT Pub. No.: WO2019/206374
PCT Pub. Date: Oct. 31, 2019

(65) Prior Publication Data
US 2021/0242753 A1    Aug. 5, 2021

(30) Foreign Application Priority Data

Apr. 27, 2018 (DE) .................... 10 2018 003 446.2
Jul. 25, 2018 (DE) .................... 10 2018 117 987.1

(51) Int. Cl.
*H02K 11/33* (2016.01)
*H02K 5/173* (2006.01)
(Continued)

(52) U.S. Cl.
CPC ........... *H02K 11/33* (2016.01); *H02K 5/1735* (2013.01); *H02K 5/225* (2013.01); *H02K 7/085* (2013.01); *H02K 9/223* (2021.01); *H02K 9/227* (2021.01)

(58) Field of Classification Search
CPC ........ H02K 11/33; H02K 11/30; H02K 9/223; H02K 9/227; H02K 9/225; H02K 9/28; H02K 7/085; H02K 5/1735; H02K 5/18; H02K 5/50; H02K 5/203; H02K 5/207; H02K 5/225
See application file for complete search history.

(56) References Cited

U.S. PATENT DOCUMENTS 5,763,969 A * 6/1998 Metheny ................ H02K 11/33
310/58
8,220,426 B2    7/2012 Uehama et al.
(Continued)

FOREIGN PATENT DOCUMENTS

CN    101035974 A    9/2007
CN    101128659 A    2/2008
(Continued)

*Primary Examiner* — Nguyen Tran

(57) ABSTRACT

The disclosure relates to an electric motor comprising a base motor module and a plug module which is electrically and mechanically connected to the base motor module and is designed as an electronics module. The electronics module comprises a power electronics system, a driver electronics system and a control electronics system, and the electronics module and the base motor module each dissipate heat via separated heat paths. The disclosure further relates to an electric motor arrangement and also to a construction kit for electric motors.

20 Claims, 4 Drawing Sheets

Heat Path A    Heat Path B

(51) Int. Cl.
*H02K 5/22* (2006.01)
*H02K 7/08* (2006.01)
*H02K 9/22* (2006.01)

(56) References Cited

U.S. PATENT DOCUMENTS

| | | | |
|---|---|---|---|
| 8,564,161 B1 | 10/2013 | Yamasaki | |
| 2002/0185926 A1* | 12/2002 | King | H02P 6/182 |
| | | | 310/68 B |
| 2007/0251473 A1* | 11/2007 | Schafer | F01L 1/022 |
| | | | 123/90.11 |
| 2014/0265664 A1* | 9/2014 | Camilleri | H02K 15/14 |
| | | | 310/59 |
| 2016/0134178 A1* | 5/2016 | Acinas Lope | B62D 5/0406 |
| | | | 310/64 |
| 2016/0359434 A1 | 12/2016 | Numata et al. | |
| 2017/0187267 A1 | 6/2017 | Krah | |
| 2018/0248440 A1* | 8/2018 | Yamashita | H02K 5/10 |

FOREIGN PATENT DOCUMENTS

| | | |
|---|---|---|
| CN | 101603440 A | 12/2009 |
| CN | 205069616 U | 3/2016 |
| CN | 206099615 U | 4/2017 |
| CN | 107531225 A | 1/2018 |
| CN | 107947452 A | 4/2018 |
| DE | 19846220 A1 | 4/2000 |
| DE | 10026424 C2 | 12/2002 |
| DE | 102004037991 A1 | 11/2005 |
| DE | 102010003278 A1 | 9/2011 |
| DE | 102013212933 B3 | 11/2014 |
| DE | 102014215523 A1 | 7/2015 |
| DE | 102014205689 A1 | 10/2015 |
| DE | 102015219149 A1 | 3/2017 |
| EP | 2658359 A2 | 10/2013 |
| WO | 2006039968 A1 | 4/2006 |
| WO | 2007122181 A1 | 11/2007 |
| WO | 2016065485 A1 | 5/2016 |
| WO | 2019015720 A1 | 1/2019 |

* cited by examiner

Heat Path A    Heat Path B

ELECTRIC MOTOR

CROSS-REFERENCE TO RELATED APPLICATIONS

This application is the U.S. National Phase of PCT Application No. PCT/DE2019/100355 filed on Apr. 17, 2019 which claims priority to DE 10 2018 003 446.2 filed on Apr. 27, 2018 and DE 10 2018 117 987.1 filed on Jul. 25, 2018, the entire disclosures of which are incorporated by reference herein.

TECHNICAL FIELD

The disclosure relates to an electric motor suitable for use in an electric camshaft adjuster or in a mechanism for adjusting the piston stroke of an internal combustion engine.

BACKGROUND

An electric motor for an electric camshaft adjuster is known, for example, from DE 10 2013 212 933 B3. This electric motor comprises a first, pot-shaped housing part made of metal and a second housing part made of plastic, which seals off the first housing part, wherein a first rolling bearing is arranged in the first housing part and a second rolling bearing is arranged in the second housing part. Here, the rolling bearing arranged in the first, pot-shaped housing part is designed as a fixed bearing. A shaft seal is located on the side of this rolling bearing facing the interior of the housing.

Another electric motor of an electric camshaft adjuster is disclosed in U.S. Pat. No. 8,220,426 B2. In this case too, a motor shaft of the electric motor is supported by means of two rolling bearings, namely ball bearings.

Electric motors for such an application are known for example from patents DE 10 2013 212 933 B3 and U.S. Pat. No. 8,220,426 B2. In both publications, electric motors for camshaft adjustment are described, which are suitable for use on internal combustion engines of cars. Externally arranged control electronics systems are required in order to be able to implement the desired control functions. Such electric motors can therefore only be used in an internal combustion engine if additional control units matched to the electric motor are used with appropriate cabling. Alternatively, this function can be added to the motor control unit. In each of the two cases, the use of the electric motor is associated with additional effort.

US 2016/359 434 A1, for example, goes one step further. An electric motor with an integrated driver bridge is described here, i.e., the power electronics are embedded in the electric motor. However, an additional external control unit is still required, which contains the heat-sensitive control electronics system, for example a microprocessor.

SUMMARY

The object of the disclosure is to further develop electric motors suitable for camshaft adjusters in such a way that the control electronics system and the electric motor form one unit.

Accordingly, the electric motor has a base motor module and a plug module that is electrically and mechanically connected to said base motor module and is designed as an electronics module. The electronics module comprises the power electronics system, the driver electronics system and the control electronics system, wherein the electronics module and the base motor module dissipate heat via one heat path each, wherein the heat paths are separated from one another. By separating the heat paths, the waste heat from the base motor module and electronics module can be conducted separately into a heat sink in the surroundings. The waste heat from the electric motor can, for example, be given off to the motor block or another surrounding component. The temperature therefore corresponds to the oil temperature. The waste heat from the electronics module can be dissipated to the surroundings.

In one embodiment, the base motor module dissipates heat via a heat path A, wherein the heat is conducted via a heat-conducting plate into a heat sink. The contact surface can be enlarged and the heat dissipation can be facilitated via the heat-conducting plate.

In one embodiment, the heat-conducting plate consists of a flat surface and is suitable for being brought into contact with a component adjacent to the electric motor and forms the heat sink. The adjacent component can be a control gear box cover.

In one embodiment, the adjacent component has a flat counter surface. In this way, the thermal conductivity between the components can be optimized.

In one embodiment, the heat-conducting plate is configured as part of a flange plate, which forms a press fit with the base motor and the base motor module. The base motor module thus comprises the base motor and the flange plate. The flange plate is suitable for attaching the base motor module to a surrounding component and for forming a heat conduction path between the base motor and the adjacent component.

In one embodiment, the electronics module comprises an electronics housing and dissipates heat via a heat path B, wherein the heat path B passes through the electronics housing to the surroundings as a heat sink. The heat paths A and B can be separated in this way, which protects the electronics module from overheating.

A further separation of the heat paths can be achieved in that the two heat paths are separated from one another by an insulation space, wherein the insulation space is formed between the base motor module and the electronics module.

In one embodiment, the base motor module comprises a housing pot, a stator and a rotor mounted in the housing pot by means of a rolling bearing and is inserted into the plug module. Electrical connections are made between the plug module and the base motor module through connections that can be produced by joining the modules together in their axial direction. In a further development, the plug module comprises a sensor board interacting with the rotor. In a further development, the electrical connections between the plug module and the base motor module are formed as insulation displacement connections.

The object is further achieved by an electric motor arrangement for a variable valve train of an internal combustion engine, wherein the arrangement has two electric motors and wherein at least one of the two electric motors is designed according to any one of the preceding embodiments. The two electric motors are interconnected in master-slave operation. In this way, a fail-safe function can be implemented in that one electric motor also takes over the control of the other electric motor if one of the motor controls has failed. In addition, it is conceivable to equip only one of the electric motors with a control unit for cost reasons.

The object is further achieved by a construction kit, comprising modules of electric motors, in particular a uniform base motor module and various plug modules that can be combined with the base motor module and that differ from one another in terms of sensor systems and control electronics systems, wherein the base motor module and each plug module form parts of insulation displacement connections, which can be completed by joining the various modules in the axial direction of the base motor module.

BRIEF DESCRIPTION OF THE DRAWINGS

In the following, an exemplary embodiment of the disclosure is explained in more detail by means of drawings. In the figures.

DETAILED DESCRIPTION OF THE EMBODIMENTS

Figure 1:
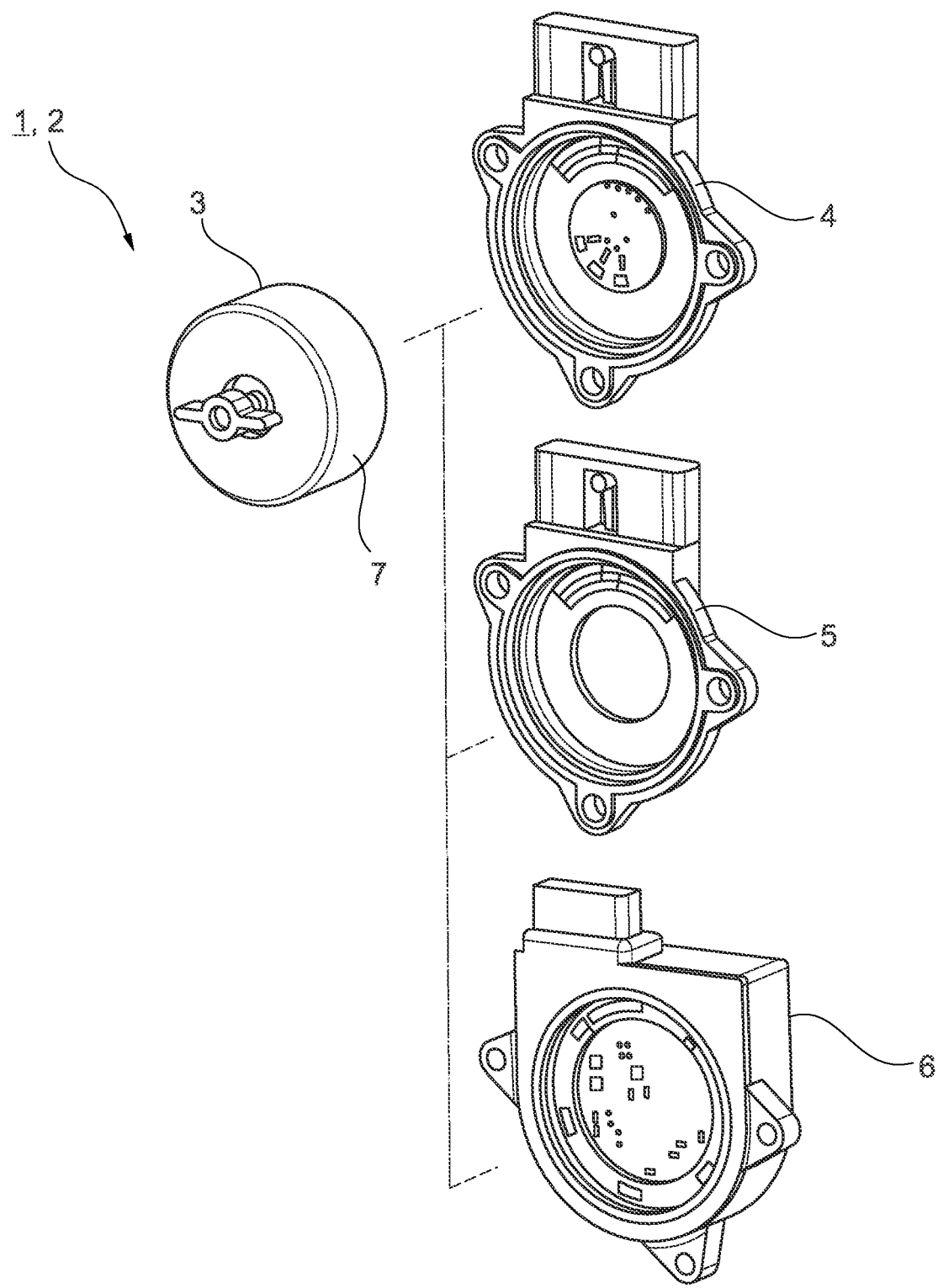
FIG. 1 shows a set for assembling electric motors, formed of a base motor module and various connector modules.

FIG. 1 shows a construction kit, generally designated by the reference numeral 1, which is suitable for constructing various electric motors 2. The electric motors 2 are used in electromechanical camshaft adjusters, as are known in principle from the prior art mentioned.

The construction kit 1 is composed of a base motor module 3 and various plug modules 4, 5, 6. All core functions of the electric motor 2 are implemented in the base motor module 3. The structure of the base motor module 3 and a complete electric motor 2 can be seen in FIG. 3. A housing 7 of the base motor module 3 is configured as a housing pot made of sheet metal.

Figure 2:
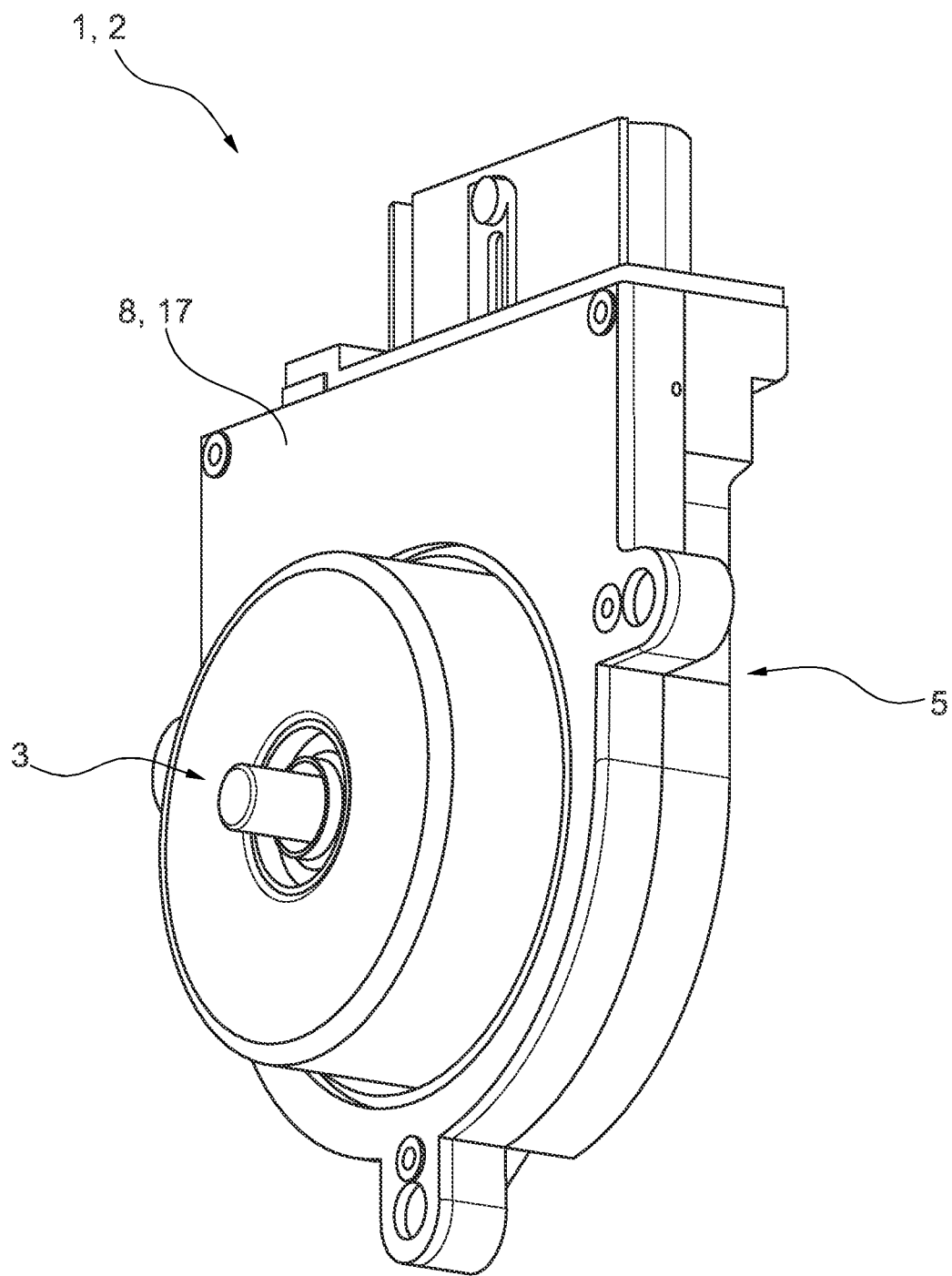
FIG. 2 shows a representation of the electric motor with a base module and an electronics module or plug module.

FIG. 2 illustrates the structure of the electric motor 2 in the joined configuration. A base motor module 3 is shown with a flange plate 8, which can be brought into contact with a motor-fixed component. Due to the flat contact, heat that is developed by the electric motor 2 can be dissipated. The power and control electronics systems for controlling the electric motor 2 are located in the electronics module 4, 5, 6.

Figure 3:
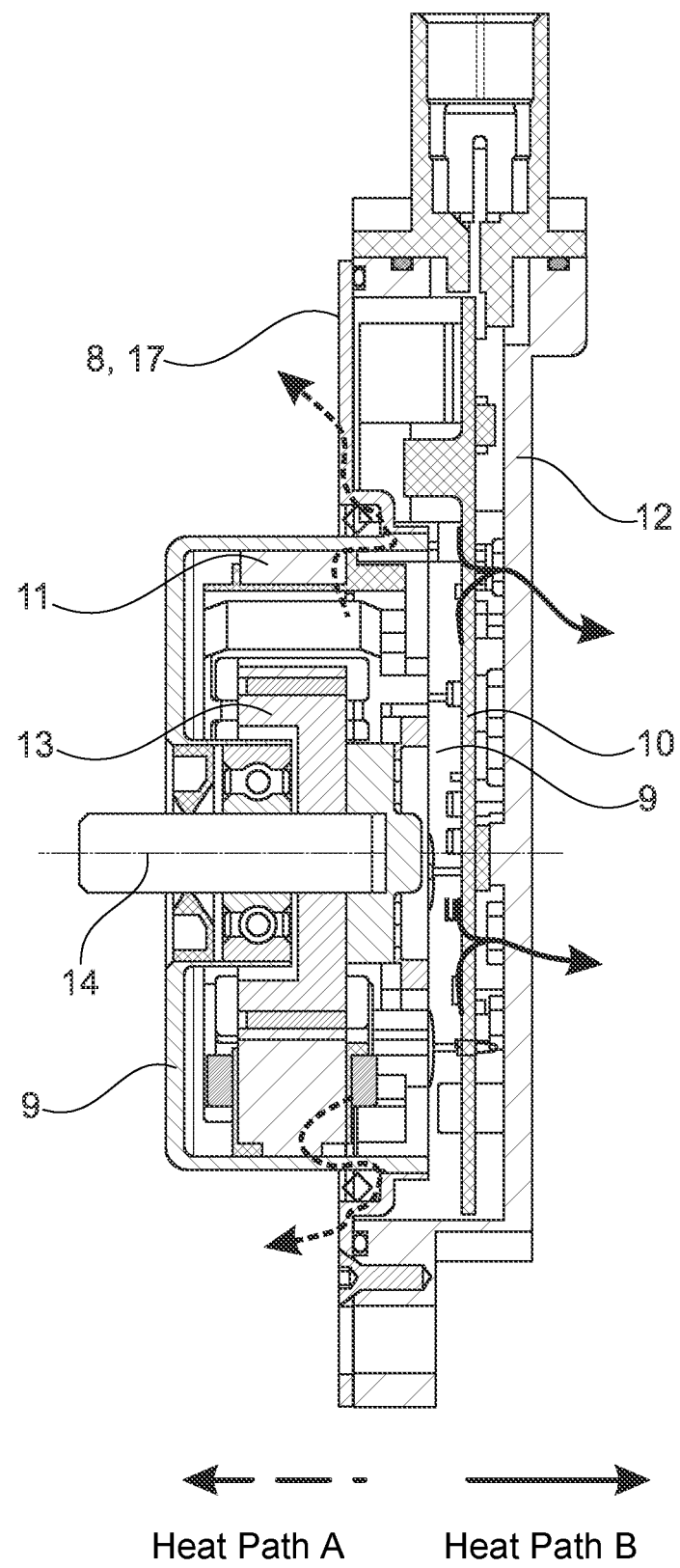
FIG. 3 shows a sectional view of the electric motor with two independent heat paths.

FIG. 3 illustrates the structure in a sectional view. The heat path A is indicated with a dashed line, and the heat path B is indicated with a solid line. It can be clearly seen that the heat paths run separately from one another via an insulating air space 9.

Overall, the base motor module 3 is constructed as an inner rotor, wherein a stator 11, which has windings that can be energized, cooperates with a rotor 13 fastened on a shaft 14, i.e., a motor shaft. The rotor 13 has a pot shape that is open towards the housing base 9. A rotor base denoted by reference numeral 15 thus faces the end face of the base motor module 3 that faces away from the housing base 9. This is the end face of the base motor module 3 that is to be connected to one of the plug modules 4, 5, 6, as will be explained in more detail below. The rotor is equipped with permanent magnets 16. Overall, the base motor module 3 functions as a brushless DC motor. The permanent magnets 16 are embedded in a hollow cylindrical section of the rotor 13 which connects to the rotor base 15 and is slipped over the annular shoulder, i.e., overlaps with the latter in the axial direction.

The waste heat from the power electronics system and the waste heat from the motor windings are dissipated via separate heat paths A, B. The waste heat from the electric motor 2 is largely dissipated into a screw-on body, and the waste heat from the power electronics system is dissipated to the surroundings via an upstream heat sink.

The construction kit 1 with integrated control and driver electronics systems thus has two separate heat dissipation paths A and B in only one structural unit. This makes it possible to operate the electric motor 2 at high temperatures and still integrate the heat-sensitive electronics system of the motor control and motor driver stage.

The simplicity of assembly is achieved by a modularity of the system, in which the base motor is inserted into a flange plate 8 with a variable shape. The electronics module 4, 5, 6 is assembled separately. The "marriage" of the base motor module and the electronics module takes place only in the final assembly step.

This enables the motor control and the motor driver to be combined in one structural unit in the form of the construction kit 1 with an electric motor 2. This solution is designed for high temperatures and mechanical loads that occur on the internal combustion engine of a vehicle by ensuring the cooling. The system can be integrated into the vehicle with little development and installation space and can be used to automatically calculate all the required control variables for the electric motor 2.

For the waste heat from the electric motor coils to not generate any additional thermal load for the control and driver electronics systems, the electric motor 2 (heat source A) can be pressed into a flange plate 8 and thermally separated from the control board 10 by an insulating air space 9. The flange plate 8 can be mounted over a large area on the screw-on surface, for example on the internal combustion engine, so that the screw-on surface represents a heat sink for this heat source A. The heat path A accordingly leads from the coils through the stator insulation and the stator laminated core 11, via the motor housing into the flange plate 8 and then into the heat sink, the screw-on surface (see FIG. 3). The motor housing and the flange plate 8 can be made of steel in order to ensure a stable press fit even with high temperature fluctuations. In addition, the press fit serves to connect the motor housing to the flange plate 8 over a large area. Flattening the surfaces when joining the press fit increases the actual contact area and thus improves the heat conduction between the two joining partners.

This heat path A can be thermally separated from the power electronics system by an insulating air space 9. The waste heat generated by the power loss of the electronic components on the control board represents heat source B. This is dissipated via a second heat path B into a larger heat capacity, the electronics housing 12, and finally to the environment (see FIG. 3). The electronics housing 12 can consist of a very good heat-conducting material, such as aluminum, and can quickly absorb the waste heat generated suddenly in the electronic components and dissipate it to the surroundings via a generously dimensioned, rough surface. For better discharge of the waste heat into the heat capacity, components with particularly high power losses can be connected to the electronics housing 12 by using using heat-conducting paste. In addition, empty areas of the board can be connected to the electronics housing 12 with heat-conducting paste for better heat dissipation. Furthermore, the large surface area use of the heat-conducting paste serves to dampen the vibrations of the internal combustion engine coupled into the electric motor 2.

The control electronics system in particular, for example a microprocessor, is sensitive to heat and must be adequately protected against external heat input and its own waste heat must be dissipated. The separation of the heat dissipation of the two heat sources A and B via the heat paths A and B (see FIG. 3) enables this mechatronic system to operate even at high ambient temperatures. At least one microcontroller for generating the control signals for the motor driver is installed on the control board 10. The microcontroller processes the fed-in target values into the necessary control variables and control signals for the motor driver. The latter energizes the phases of the electric motor 2. There are also circuits for signal filtering and protective circuits on the board, as well as an optional sensor system.

According to the current prior art, welding or soldering techniques are primarily used to establish the electrical connection between the motor phases and the supply lines. The proposed concept uses insulation displacement contacts for contacting the coil wires and press-fit technology for connection to the control board 10. Both techniques result in a permanently pre-stressed contact, which offers higher vibration resistance and is produced by simple, mechanical joining processes. The contact pins in the plug of the plug module 4, 5, 6 are also contacted to the board by means of press-fit connections in order to achieve high vibration resistance here as well.

Figure 4:
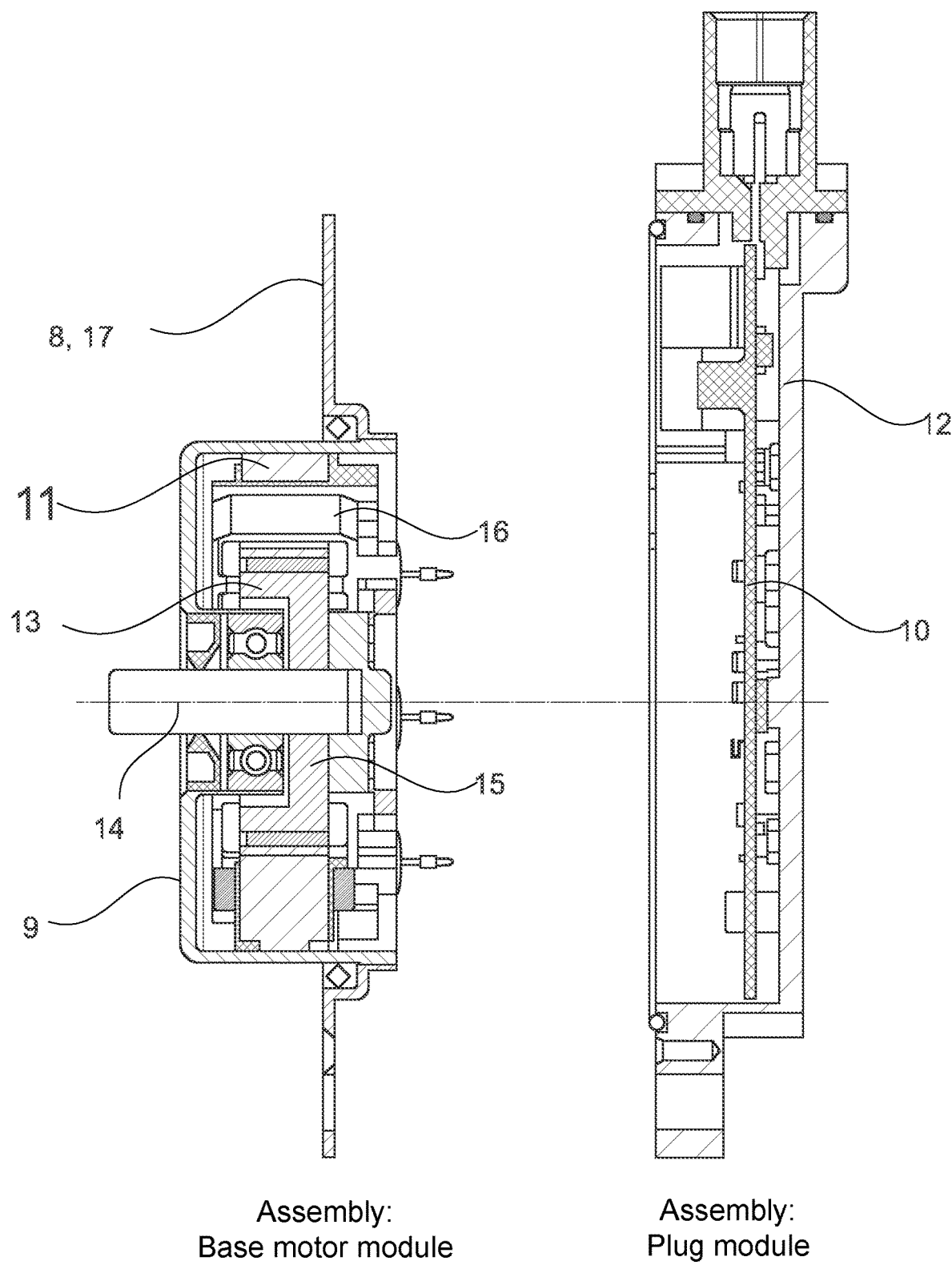
FIG. 4 shows a sectional view of the electric motor with two independent heat paths before joining the two modules.

FIG. 4 illustrates the modular structure, whereby a common parts strategy can be implemented. The assembly can be divided into two parallel pre-assembly chains. The plug module 4, 5, 6, consisting of the plug connector, electronics housing 12 and control board 10, is constructed separately and thus enables variability with regard to the installation space geometry and the choice of the plug connector type (see FIG. 4). The electric motor with the electric motor stator 11, rotor 13 and output shaft 14 with output element can be preassembled in parallel (see FIG. 4). Subsequently, the electric motor 2 is pressed into the flange plate 8, which depicts the screw-on geometry and is finally mounted on the plug module 4, 5, 6 (electronics module) during the so-called "marriage", wherein the electrical contact between the motor phases and the control board 10 is established simultaneously. This structure offers flexibility (the screw-on geometry, the housing and the plug interface) when using the common parts principle (by using a standardized base motor).

If a second, structurally identical or similar electric motor 2 is to be used, for example in the case of V engines or on intake and exhaust camshafts, the systems can be interconnected in a master-slave configuration. One system takes over the calculation of the controlled variables and controls itself as the master system and a second electric motor as the slave system.

Furthermore, an operating mode is possible in which two identical electric motors are used, which mutually monitor each other for correct function. In the event of a fault, the intact system can temporarily control the other faulty electric motor while the faulty system restarts. They thus mutually ensure their own operation by means of simple redundancy.

LIST OF REFERENCE CHARACTERS

1 Construction kit
2 Electric motor
3 Base motor module
4 Plug module
5 Plug module
6 Plug module
7 Housing
8 Flange plate
9 Air space as insulation space
10 Control board
11 Stator laminated core
12 Electronics housing
13 Rotor
14 Output shaft
15 Rotor base
16 Permanent magnet
17 Heat-conducting plate

The invention claimed is:
1. An electric motor comprising:
a base motor module including:
a first housing;
a rotor and a stator disposed within the first housing; and
a heat-conducting plate attached to the first housing,
a plug module electrically and mechanically connected to the base motor module, the plug module configured as an electronics module including:
a plug connector;
an electronics housing configured to be attached to the base motor module;
a power electronics system;
a driver electronics system; and,
a control electronics system; and,
the base motor module is configured to dissipate heat via a first heat path formed via at least the first housing and the heat-conducting plate, and the heat-conducting plate is configured to conduct heat from the base motor module to a heat sink arranged outside of the electric motor; and
the electronics module is configured to dissipate heat via a second heat path, and the first heat path is separated from the second heat path via an insulating air space formed between the base motor module and the electronics module.

2. The electric motor of claim 1, wherein the heat-conducting plate has a first flat surface configured to contact a component adjacent to and separate from the electric motor, the component configured as the heat sink.

3. The electric motor of claim 2, wherein the component has a second flat surface configured to engage the heat-conducting plate.

4. The electric motor of claim 1, wherein the heat-conducting plate forms a press fit with the first housing of the electric motor.

5. The electric motor of claim 1, wherein the second heat path is configured to flow away from the base motor module and through the electronics housing to an external heat sink.

6. The electric motor of claim 1, wherein electrical connections between the plug module and the base motor module are formed by joining the plug module and the base motor module together in an axial direction.

7. An electric motor construction kit, comprising a base motor module and a plurality of selectable plug modules, each one of the plurality of selectable plug modules configured to be electrically and mechanically connected to the base motor module, and each one of the plurality of selectable plug modules being different from one another, wherein each one of the plurality of selectable plug modules is configured as an electronics module including:
a power electronics system;
a driver electronics system; and,
a control electronics system; and,
the base motor module configured to dissipate heat via a first heat path, and each one of the plurality of selectable plug modules configured to dissipate heat via a second heat path, the first heat path separate from the second heat path.

8. The electric motor of claim 1, wherein the first heat path resides solely within the base motor module and the second heat path resides solely within the plug module.

9. The electric motor construction kit of claim 7, wherein each one of the plurality of selectable plug modules and the base motor module form an insulating air space, the insulating air space defining a beginning of the second heat path.

10. The electric motor construction kit of claim 9, wherein the base motor module includes a first housing and a heat-conducting plate attached to the first housing, the first housing and heat-conducting plate forming at least a portion of the first heat path, and the heat-conducting plate configured to conduct heat from the base motor module to a heat sink.

11. The electric motor of claim 1, wherein the insulating air space defines a beginning of the second heat path.

12. The electric motor of claim 1, wherein the power electronics system, the driver electronics system and the control electronics system are fixed to the electronics housing.

13. The electric motor of claim 5, wherein the first heat path extends through a wall of the first housing and the second heat path extends through a wall of the electronics housing.

14. An electric motor assembly comprising:
 a first pre-assembly of a base motor module; and
 a second pre-assembly of a plug module constructed separately from the first pre-assembly, the plug module configured as an electronics module including:
  a plug connector;
  a power electronics system;
  a driver electronics system; and,
  a control electronics system; and,
 the first pre-assembly of the base motor module configured to be electrically and mechanically connected to the second pre-assembly of the plug module; and,
 the first pre-assembly of the base motor module configured to dissipate heat via a first heat path, and the electronics module configured to dissipate heat via a second heat path, the first heat path separated from the second heat path via an insulating air space formed between the first pre-assembly of the base motor module and the second pre-assembly of the plug module, and the insulating air space defines a beginning of the second heat path.

15. The electric motor assembly of claim 14, wherein the first pre-assembly of the base motor module comprises a housing pot disposed at least partially within the second pre-assembly of the plug module.

16. The electric motor assembly of claim 14, wherein the first pre-assembly of the base motor module includes a rotor and a stator, and the second pre-assembly of the plug module includes a plug connector.

17. The electric motor assembly of claim 16, wherein:
 the first pre-assembly of the base motor module comprises a housing pot and a heat-conducting plate fixed to the housing pot; and,
 the first heat path extends: i) radially outwardly from the stator, ii) through a wall of the housing pot, and iii) to the heat-conducting plate; and
 the heat-conducting plate is configured to contact a component adjacent to and separate from the electric motor assembly, the component configured as a heat sink.

18. The electric motor of claim 1, wherein the heat-conducting plate is mounted to the plug module.

19. The electric motor of claim 1, wherein the heat-conducting plate extends completely around the first housing.

20. The electric motor assembly of claim 17, wherein the heat-conducting plate is mounted to the second pre-assembly of the plug module.

\* \* \* \* \*